US012164093B2

(12) United States Patent
Zheng et al.

(10) Patent No.: US 12,164,093 B2
(45) Date of Patent: Dec. 10, 2024

(54) REFLECTIVE COMPACT LENS FOR MAGNETO-OPTIC KERR EFFECT METROLOGY SYSTEM

(71) Applicant: KLA CORPORATION, Milpitas, CA (US)

(72) Inventors: Alex Zheng, Xuhui (CN); Jun Wang, Shanghai (CN); David Y. Wang, Santa Clara, CA (US); Chunxia Li, Shanghai (CN); Changfei Yan, Shanghai (CN); Rui Ni, Shanghai (CN); Lansheng Dong, Shanghai (CN); Yang Zhou, Shanghai (CN); Hai-Yang You, Shanghai (CN); Haijing Peng, Shanghai (CN); Walter H. Johnson, Rocklin, CA (US); Shankar Krishnan, Santa Clara, CA (US); Jianou Shi, Palo Alto, CA (US)

( * ) Notice: Subject to any disclaimer, the term of this patent is extended or adjusted under 35 U.S.C. 154(b) by 74 days.

(21) Appl. No.: 17/505,591

(22) Filed: Oct. 19, 2021

(65) Prior Publication Data

US 2022/0137380 A1  May 5, 2022

Related U.S. Application Data

(60) Provisional application No. 63/107,448, filed on Oct. 30, 2020.

(51) Int. Cl.
*G02B 17/06* (2006.01)
*G02B 5/10* (2006.01)

(52) U.S. Cl.
CPC ............. *G02B 17/061* (2013.01); *G02B 5/10* (2013.01)

(58) Field of Classification Search
CPC .............. G02B 17/0808; G02B 21/361; G02B 21/0016; G02B 21/0032
See application file for complete search history.

(56) References Cited

U.S. PATENT DOCUMENTS

| 4,440,475 | A |   | 4/1984 | Colliaux |              |
|-----------|---|---|--------|----------|--------------|
| 5,136,413 | A | * | 8/1992 | MacDonald | G03F 7/70233 |
|           |   |   |        |          | 250/236      |

(Continued)

FOREIGN PATENT DOCUMENTS

| CN | 105891744 A   | 8/2016 |            |
|----|---------------|--------|------------|
| CN | 106990052 A * | 7/2017 | G01J 3/0208 |

(Continued)

OTHER PUBLICATIONS

Durrant, C. J., et al. "Scanning Kerr microscopy study of current-induced switching in Ta/CoFeB/MgO films with perpendicular magnetic anisotropy." Physical Review B 93.1 (2016): 014414. (Year: 2016).*

(Continued)

*Primary Examiner* — Christopher Stanford
(74) *Attorney, Agent, or Firm* — Hodgson Russ LLP (57) ABSTRACT

A Cassegrain or quasi-Cassegrain structure objective lens is used in a polar MOKE metrology system. The quasi-Cassegrain reflective objective lens includes a primary concave mirror and a secondary mirror. The primary concave mirror has a wider diameter than the secondary mirror and defines an aperture through which the laser beam is configured to be transmitted toward the secondary mirror. The secondary mirror can be convex, concave, or have a flat surface.

19 Claims, 8 Drawing Sheets

(56) References Cited

U.S. PATENT DOCUMENTS

| | | | |
|---|---|---|---|
| 5,608,526 A | 3/1997 | Piwonka-Corle et al. | |
| 5,859,424 A | 1/1999 | Norton et al. | |
| 6,429,943 B1 | 8/2002 | Opsal et al. | |
| 6,853,772 B2* | 2/2005 | Battiato | G02B 6/02152 385/52 |
| 7,082,001 B2* | 7/2006 | Vizgaitis | G02B 17/0856 359/729 |
| 7,478,019 B2 | 1/2009 | Zangooie et al. | |
| 7,684,145 B2 | 3/2010 | Van Drent et al. | |
| 7,933,026 B2 | 4/2011 | Opsal et al. | |
| 8,186,069 B1* | 5/2012 | Ho | G01B 11/27 33/286 |
| 8,472,111 B2* | 6/2013 | Gelernt | G02B 21/16 359/368 |
| 8,531,674 B2* | 9/2013 | Soga | G01N 21/3563 250/341.1 |
| 9,665,008 B2 | 5/2017 | Saenger et al. | |
| 9,915,522 B1 | 3/2018 | Jiang et al. | |
| 10,309,907 B2* | 6/2019 | Zhang | G02B 13/143 |
| 2012/0306998 A1 | 12/2012 | Merrill, II et al. | |
| 2013/0335817 A1 | 12/2013 | Isobe et al. | |
| 2014/0172394 A1 | 6/2014 | Kuznetsov et al. | |
| 2014/0222380 A1 | 8/2014 | Kuznetsov et al. | |
| 2015/0204664 A1 | 7/2015 | Bringoltz et al. | |
| 2020/0292803 A1* | 9/2020 | Harig | G02B 21/0032 |
| 2020/0302965 A1 | 9/2020 | Wang et al. | |
| 2022/0050225 A1* | 2/2022 | Li | G03F 7/2037 |
| 2022/0113530 A1* | 4/2022 | Hirose | G02B 21/362 |

FOREIGN PATENT DOCUMENTS

| | | | | |
|---|---|---|---|---|
| CN | 103278916 B | * | 6/2018 | |
| CN | 111123504 A | * | 5/2020 | |
| FR | 2596863 A1 | * | 10/1987 | |
| GB | 2195467 A | * | 4/1988 | G01J 3/02 |
| GB | 2493811 A | | 2/2013 | |
| JP | S6244652 A | * | 2/1987 | |
| JP | H05297278 A | * | 11/1993 | |
| JP | H10185805 A | | 7/1998 | |
| JP | 2005331419 A | * | 12/2005 | |
| JP | 3967406 B2 | * | 8/2007 | |
| JP | 4327993 B2 | * | 9/2009 | G01Q 60/22 |
| JP | 2009251412 A | | 10/2009 | |
| JP | 2012251797 A | * | 12/2012 | |
| JP | 2018116136 A | | 7/2018 | |
| KR | 20160086463 A | | 7/2016 | |
| WO | WO-2012169935 A2 | * | 12/2012 | G01B 11/27 |
| WO | WO-2016084418 A1 | * | 6/2016 | G02B 17/08 |

OTHER PUBLICATIONS

Nakayama, Satoru, et al. "Magneto-optic Kerr effect CCD imaging with polarization modulation technique." AIP Advances 7.5 (2017). (Year: 2017).*
Henn, T., et al. "Ultrafast supercontinuum fiber-laser based pump-probe scanning magneto-optical Kerr effect microscope . . . " Review of Scientific Instruments 84.12 (2013) (Year: 2013).*
Flajšman, Lukáš, et al. "High-resolution fully vectorial scanning Kerr magnetometer." Review of Scientific Instruments 87.5 (2016). (Year: 2016).*
Pathak, Sachin, and Manish Sharma. "Polar magneto-optical Kerr effect instrument for 1-dimensional magnetic nanostructures." Journal of Applied Physics 115.4 (2014). (Year: 2014).*
Neff, David, et al. "Developing a Kerr microscope for upper-division solid-state physics laboratories." American Journal of Physics 82.6 (2014): 574-582. (Year: 2014).*
WIPO, International Search Report for International Application No. PCT/US2021/057161, Feb. 18, 2022.
Durham Magneto Optics Ltd, "NanoMOKE3 Wafer Mapper," Product Specifications, 2012.
Arora et al., "A mirror based polar magneto-optical Kerr effect spectroscopy arrangement," Review of Scientific Instruments, vol. 82, No. 123903, Dec. 19, 2011.
Hennen, "Magneto-Optic Kerr Effect Microscopy," Electric and Computer Engineering Department, University of California, San Diego, Dec. 9, 2014.
Tveten, "Optical coatings for enhancement of the longitudinal magneto-optic Kerr effect from magnetic ultra-thin films," Department of Physics, Norwegian University of Science and Technology, Jun. 27, 2011.

* cited by examiner

REFLECTIVE COMPACT LENS FOR MAGNETO-OPTIC KERR EFFECT METROLOGY SYSTEM

CROSS-REFERENCE TO RELATED APPLICATIONS

This application claims priority to the provisional patent application filed Oct. 30, 2020 and assigned U.S. App. No. 63/107,448, the disclosure of which is hereby incorporated by reference.

FIELD OF THE DISCLOSURE

This disclosure relates to semiconductor metrology systems.

BACKGROUND OF THE DISCLOSURE

Evolution of the semiconductor manufacturing industry is placing greater demands on yield management and, in particular, on metrology and inspection systems. Critical dimensions continue to shrink, yet the industry needs to decrease time for achieving high-yield, high-value production. Minimizing the total time from detecting a yield problem to fixing it maximizes the return-on-investment for a semiconductor manufacturer.

Fabricating semiconductor devices, such as logic and memory devices, typically includes processing a semiconductor wafer using a large number of fabrication processes to form various features and multiple levels of the semiconductor devices. For example, lithography is a semiconductor fabrication process that involves transferring a pattern from a reticle to a photoresist arranged on a semiconductor wafer. Additional examples of semiconductor fabrication processes include, but are not limited to, chemical-mechanical polishing (CMP), etching, deposition, and ion implantation. An arrangement of multiple semiconductor devices fabricated on a single semiconductor wafer may be separated into individual semiconductor devices.

Metrology may be used during semiconductor manufacturing to take various measurements of, for example, a semiconductor wafer or reticle during various process steps to form devices. Metrology tools can be used to measure structural and material characteristics associated with various semiconductor fabrication processes. For example, the metrology tools can measure material composition or can measure dimensional characteristics of structures and films such as film thickness, critical dimension of structures, profiles, or overlay. These measurements are used to facilitate process controls and/or yield efficiencies during the manufacture of semiconductor dies.

As semiconductor device pattern dimensions continue to shrink, smaller metrology targets are often required. Furthermore, the requirements for measurement accuracy and matching to actual device characteristics increase a need for device-like targets as well as in-die and even on-device measurements. For example, focused beam ellipsometry based on primarily reflective optics may be used. Apodizers can be used to mitigate the effects of optical diffraction causing the spread of the illumination spot beyond the size defined by geometric optics. The use of high-numerical-aperture tools with simultaneous multiple angle-of-incidence illumination is another way to achieve small-target capability.

In optical metrology system, multiple or variable incident angle capability is gaining importance when obtaining wafer surface information such as optical properties, electrical properties, and magneto-optical properties. Different incident laser beams usually reflect a variety of sample information from different points of view. With the development of nanotechnology, there is a demand for a high spatial resolution laser spot in semiconductor metrology systems for patterned structures. Over the last few decades, researchers and engineers combined the variable incident angle with high spatial resolution and many kinds of design and experimental apparatus were tested for semiconductor logic and memory chips.

With surface magneto-optic Kerr effect (SMOKE), the signal collected from different incident angles may have some differences. Therefore, a metrology system with multiple incident angles may be needed for surface information detection like polarization, reflectivity, and nanostructure. Using the variable incident angle system also can find the best signal-to-noise ratio to optimize the system performance. Furthermore, results can be typically fitted and determined at a certain incident angle, but usually measurements were made at more than two angles of incidence to reduce the effects of random errors. Exact fit to the data is typically impossible and some criterion may be needed to define, especially for measurements on thin (<10 nm) films where sensitivity is low.

Spin-transfer torque magnetic random access memory (STT-MRAM) is a solid state magnetic memory growing in use. Polar magneto-optic Kerr effect (MOKE) can be used to investigate the magnetization behavior in the development of STT-MRAM. In polar MOKE, a magnetization vector is perpendicular to the reflection surface and parallel to the plane of light incidence. Using a laser beam without converging objective lens, polar MOKE can characterize a blanket sample. However, patterning an area with dozens of micron scale, non-converging laser beams is limited due to millimeter level beam size.

A polar MOKE system with micron scale beam spot and pattern recognition capability was developed. A refractive lens was used to focus a laser beam on a sample surface in the polar MOKE system. In general, the refractive lens is made up of glass materials such as quartz, crown glass, or flint glass. These materials have a Verdet constant of 0.2~1 deg./T·mm at a visible wavelength band. When the refractive lens with a length of 10 mm made of crown glass is set up in a strong magnetic field of 10 kOe, the polarization axis of 532 nm light transmitted the lens rotates by 4.7 degree, which is dozens of times the rotation angle by the polar MOKE system recording sample.

A Schwarzschild-type reflective objective was used to eliminate unnecessary Faraday polarization rotation in the magnetic field. A Schwarzschild lens has a convex primary mirror and a concave secondary mirror. The incident beam is expanded by the primary convex mirror, which leads to large diameter secondary concave mirror to converge the beam. A Schwarzschild-type reflective objective lens normally has a large outer barrel diameter. To hold a Schwarzschild lens in a magnetic pole for a polar MOKE metrology system, a large diameter hole is perforated in the magnetic pole. Magnetic field strength and uniformity deteriorate at sample test position when the hole size increases.

Therefore, new techniques and systems are needed.

BRIEF SUMMARY OF THE DISCLOSURE

A system is provided in a first embodiment. The system includes a laser source that generates a laser beam; a quasi-Cassegrain reflective objective lens that includes a primary concave mirror and a secondary mirror; a stage configured to hold a wafer; and a detector configured to receive the laser beam reflected from the wafer. The primary concave mirror has a wider diameter than the secondary mirror. The primary concave mirror defines an aperture through which the laser beam is configured to be transmitted toward the secondary mirror.

The primary concave mirror can be configured to converge the laser beam.

The primary concave mirror can be aspheric.

In an embodiment, the secondary mirror is convex.

In an embodiment, the secondary mirror has a flat surface. The primary concave mirror has a non-parabolic aspherical surface.

In an embodiment, the secondary mirror is concave. The primary concave mirror has a non-parabolic aspherical surface.

The system can further include a polarizer and a beam splitter in a path of the laser beam. The beam splitter is disposed in the path of the laser beam between the polarizer and the quasi-Cassegrain reflective objective lens. The detector receives the laser beam from the beam splitter.

A method is provided in a second embodiment. The method includes generating a laser beam using a laser source; directing the laser beam through an aperture in a primary concave mirror of a quasi-Cassegrain reflective objective lens; reflecting the laser beam off a secondary mirror of the quasi-Cassegrain reflective objective lens after the laser beam passes through the aperture; and reflecting the laser beam off the primary concave mirror after the laser beam is reflected off the secondary mirror. The primary concave mirror has a wider diameter than the secondary mirror.

The method can further include directing the laser beam to a wafer on a stage after the laser beam is reflected off the primary concave mirror; and receiving the laser beam at a detector after the laser beam is reflected off the wafer. The laser beam can be directed through a polarizer disposed in a path of the laser beam between the laser source and the quasi-Cassegrain reflective objective lens. The laser beam can be directed through a beam splitter disposed in a path of the laser beam between the quasi-Cassegrain reflective objective lens and the detector.

The wafer can include at least one spin-transfer torque magnetic random access memory device.

The laser beam can be converged with the primary concave mirror.

The secondary mirror can be convex, concave, or can have a flat surface.

DESCRIPTION OF THE DRAWINGS

For a fuller understanding of the nature and objects of the disclosure, reference should be made to the following detailed description taken in conjunction with the accompanying drawings, in which.

DETAILED DESCRIPTION OF THE DISCLOSURE

Although claimed subject matter will be described in terms of certain embodiments, other embodiments, including embodiments that do not provide all of the benefits and features set forth herein, are also within the scope of this disclosure. Various structural, logical, process step, and electronic changes may be made without departing from the scope of the disclosure. Accordingly, the scope of the disclosure is defined only by reference to the appended claims.

Compact two mirror reflective objective lens structures for a polar MOKE metrology system are disclosed herein. A quasi-Cassegrain structure objective lens can be used in the polar MOKE metrology system. The reflective lens design eliminates unnecessary Faraday polarization rotation in a magnetic field of the polar MOKE metrology system. A primary concave mirror and secondary mirror can make the whole lens have small outer diameter when the incident laser beam has a diameter of several millimeters. A small diameter lens minimizes impact on magnetic field strength and uniformity at sample test position. Embodiments disclosed herein can be rotation symmetric and there may be no chromatic aberration extending through the application wavelength band.

Figure 1:
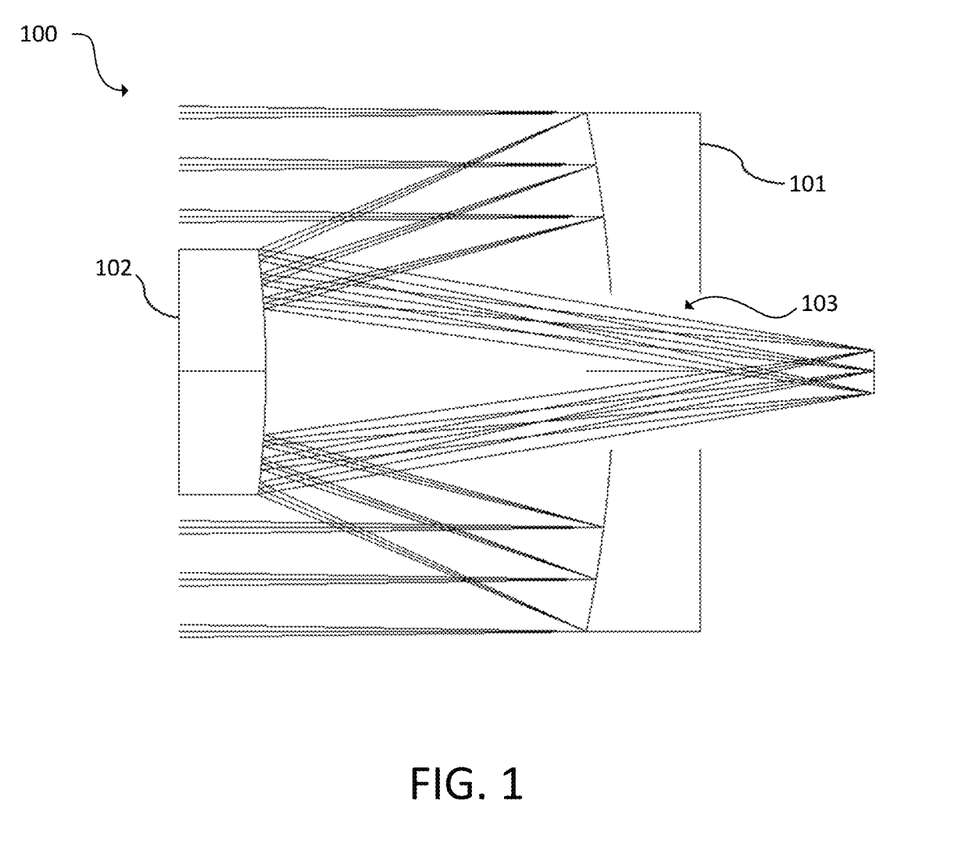
FIG. 1 is an embodiment of a quasi-Cassegrain reflective objective lens in accordance with the present disclosure.

A Cassegrain structure uses a parabolic primary mirror and a hyperbolic secondary mirror. Embodiments of the quasi-Cassegrain structure disclosed herein can change the primary mirror to a non-parabolic mirror and/or the secondary mirror to a non-hyperbolic mirror. The quasi-Cassegrain structures uses two mirrors with the primary mirror converging the incident beam. For example, a non-parabolic aspherical surface can be used for a primary mirror to extend a field of view, as shown in FIG. 1. While a quasi-Cassegrain structure is described, the improvements described herein also can be applied to a Cassegrain structure.

Figure 2:
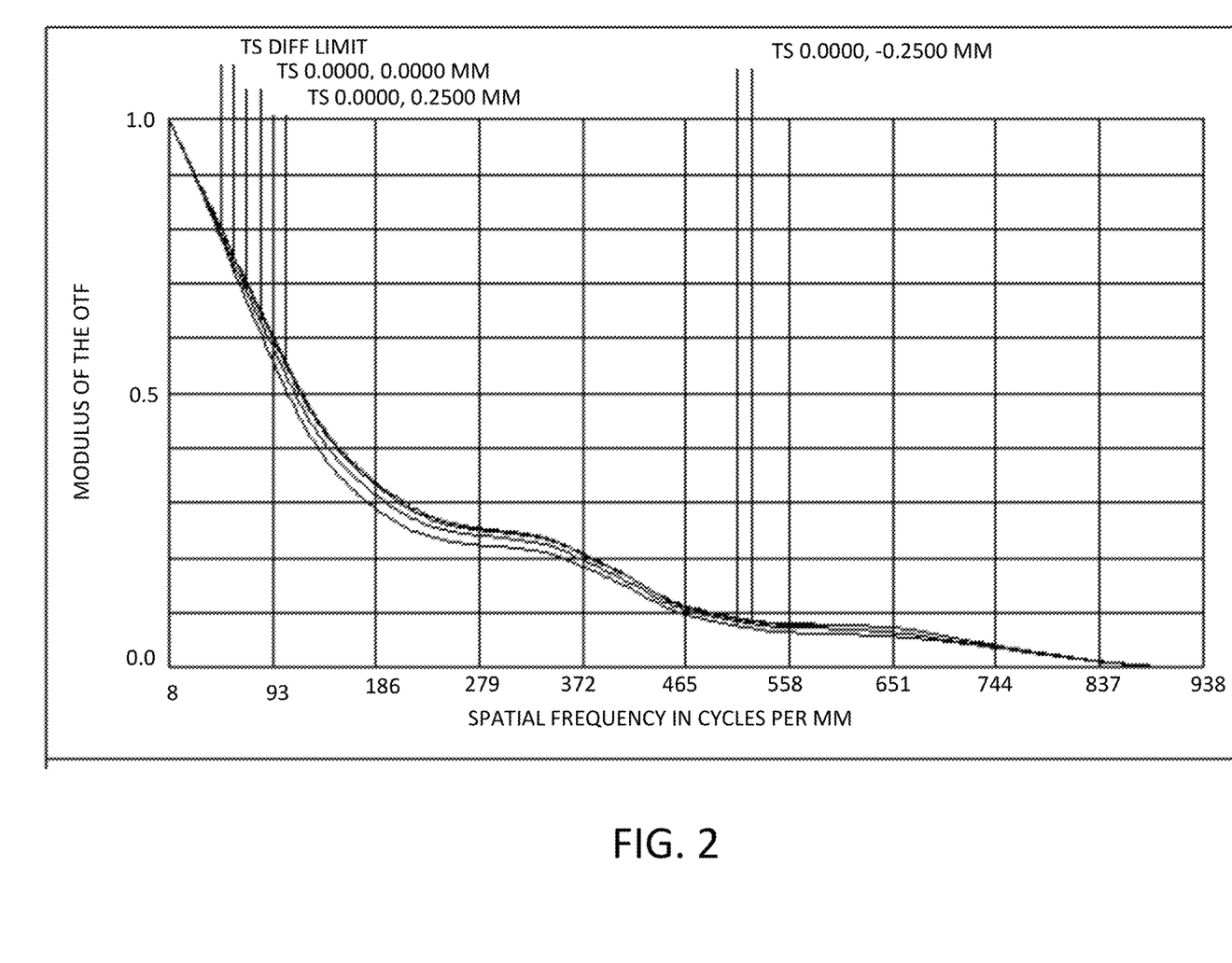
FIG. 2 is a chart showing a quasi-Cassegrain reflective objective lens modulation transfer function (MTF)

A primary concave mirror and a secondary convex mirror, such as that in FIG. 1, can be used. The incident beam is converged by primary concave aspheric mirror, then reflected by secondary smaller diameter mirror. To obtain small obscuration by secondary mirror and have enough working distance for lens, the secondary mirror may be convex in an embodiment. To extend a field of view, a non-parabolic aspherical surface can be used for primary mirror (i.e., a quasi-Cassegrain), of which an example is shown in FIG. 2 for MTF with a 0.5 mm image field. The MTF in FIG. 2 can correspond with the objective lens of FIG. 1. As shown in FIG. 2, the image field is extended to 0.5 mm with near to diffraction limit MTF.

In FIG. 1, the Cassegrain reflective objective lens 100 includes a primary concave mirror 101 and a secondary mirror 102. In an example, the primary concave mirror 101 has an R value of −12.17 and a conic parameter of −1.22. The secondary mirror 102 is convex in FIG. 1. In an example, the secondary mirror 102 has a radius of curvature (R) value of 8.56 and a conic parameter of 7.14.

The primary concave mirror 101 has a wider diameter than that of the secondary mirror 102. In an example, the primary concave mirror 101 has a diameter from 3 mm to 20 mm (e.g., 6 mm) and the secondary mirror 102 has a diameter from 2 mm to 15 mm (e.g., 2.9 mm), though other values are possible. The primary concave mirror 101 also defines an aperture 103 through which the laser beam is configured to be transmitted toward the secondary mirror 102. In an example, the aperture diameter is 2.2 mm to avoid clipping a 6 mm laser beam, though other values are possible. The primary concave mirror 101, which can be aspheric, is configured to converge the laser beam onto the secondary mirror 102.

Faraday magnetic optical effects can be avoided in polar MOKE metrology system because no refractive optical components are used in the objective lens 100. Thus, Faraday polarization rotation in a magnetic field can be eliminated. The primary concave mirror 101 can converge laser beam so that the quasi-Cassegrain reflective objective lens 100 has a compact barrel size, which minimizes the impact on magnetic field strength and uniformity when installed inside a magnetic pole. The whole reflective objective lens 100 can have a small outer diameter when the incident laser beam has a diameter of several millimeters. The smaller diameter lens can minimize the impact on magnetic field strength and uniformity at a sample test position. The design in FIG. 1 is a rotation symmetry system. There is no chromatic aberration to extend the application wavelength band.

Figure 3:
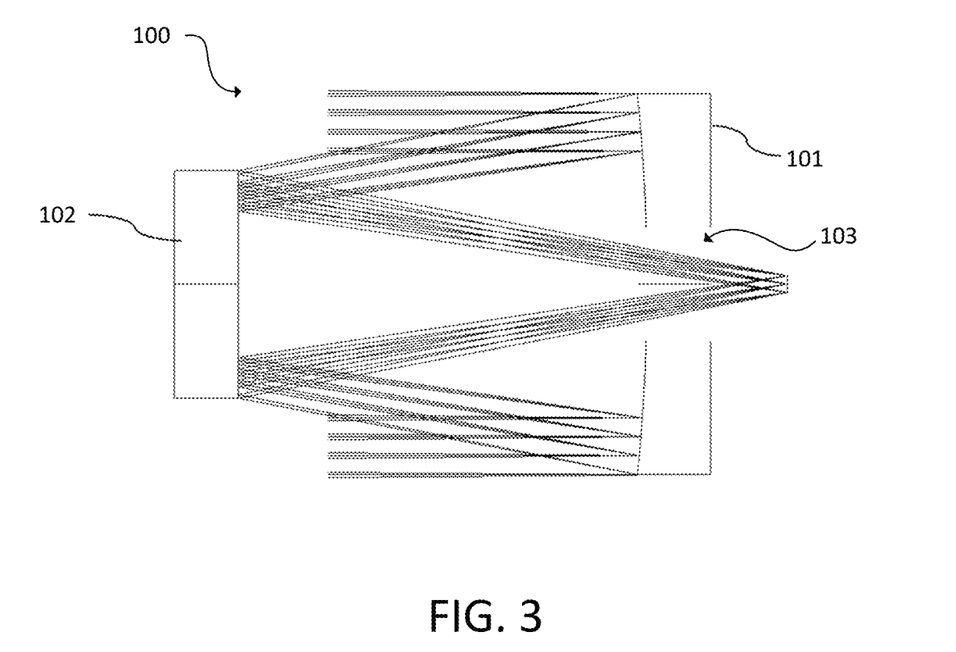
FIG. 3 is an embodiment of a reflective objective lens structure with a secondary flat mirror in accordance with the present disclosure.

In a quasi-Cassegrain embodiment, an aspheric surface conic coefficient for the primary concave mirror 101 and the secondary mirror 102 can be a flat mirror as shown in FIG. 3. A flat mirror can be easier to fabricate compared to a curved surface mirror. Thus, the secondary mirror 102 can have a flat surface that receives the laser beam through the aperture 103 as shown in FIG. 3. The primary concave mirror 101 can have a non-parabolic aspherical surface. In an example, the non-parabolic aspherical surface has an R value of −30.03 and a conic parameter of −0.97. A non-parabolic aspherical surface can be used in the primary concave mirror 101 to improve the image quality when the secondary mirror 102 is a flat mirror.

Figure 4:
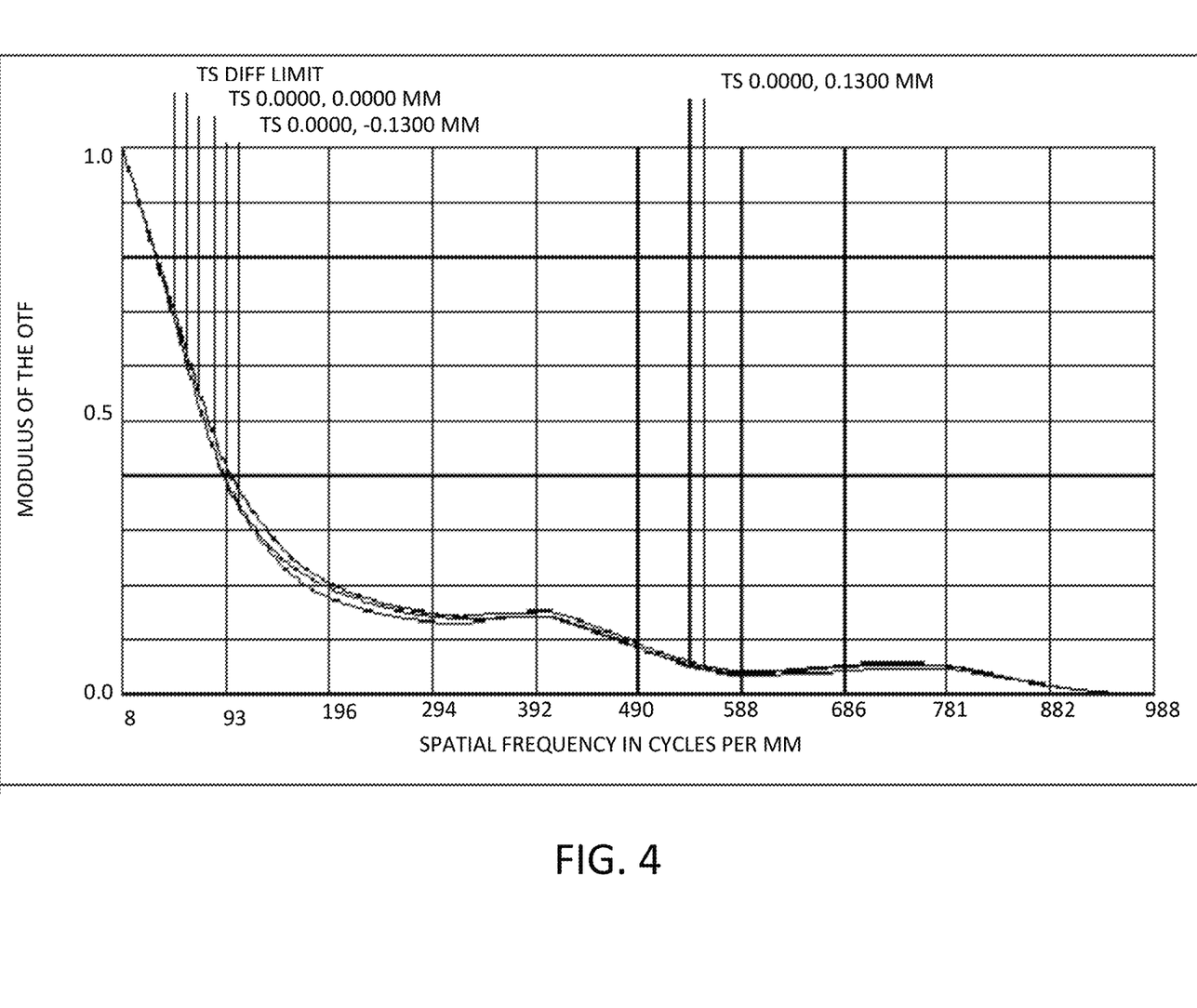
FIG. 4 is a chart showing MTF of the reflective objective lens structure of FIG. 3.

FIG. 4 shows an MTF for the Cassegrain reflective objective lens 100 of FIG. 3 with a 0.26 mm image field. The image field is extended to 0.26 mm and has near to diffraction limit MTF.

As with the embodiment of FIG. 1, the whole reflective lens design in the embodiment of FIG. 3 can eliminate unnecessary Faraday polarization rotation in a magnetic field in the polar MOKE metrology system. Use of a primary concave mirror 101 and a flat secondary mirror 102 structure can make the whole lens have a small outer diameter when the incident laser beam has a diameter of several millimeters. A small diameter lens can minimize impact on magnetic field strength and uniformity at a sample test position. The design in FIG. 3 is a rotation symmetry system. There is no chromatic aberration to extend the application wavelength band.

Figure 5:
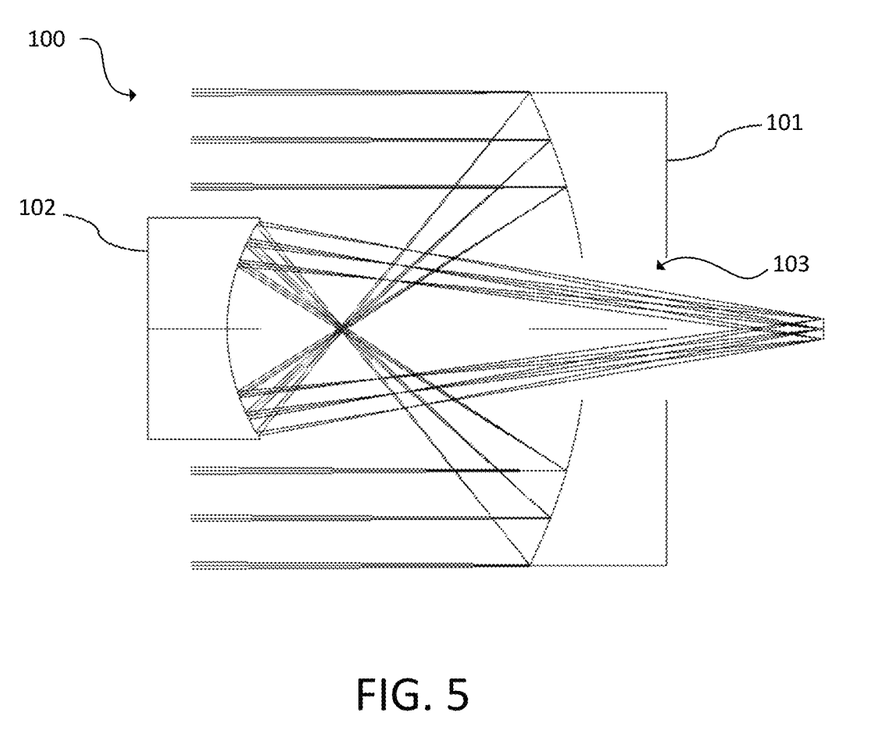
FIG. 5 is an embodiment of a reflective objective lens structure with a secondary concave mirror in accordance with the present disclosure.

An aspheric surface conic coefficient for the primary concave mirror 101 and the secondary mirror 102 can be optimized by changing the secondary mirror 102 to have a concave aspherical surface. In an example, the secondary mirror has an R value of −2.58 and a conic parameter of 0.47. The primary concave mirror 101 can have a non-parabolic aspherical surface. This is shown in FIG. 5.

Figure 6:
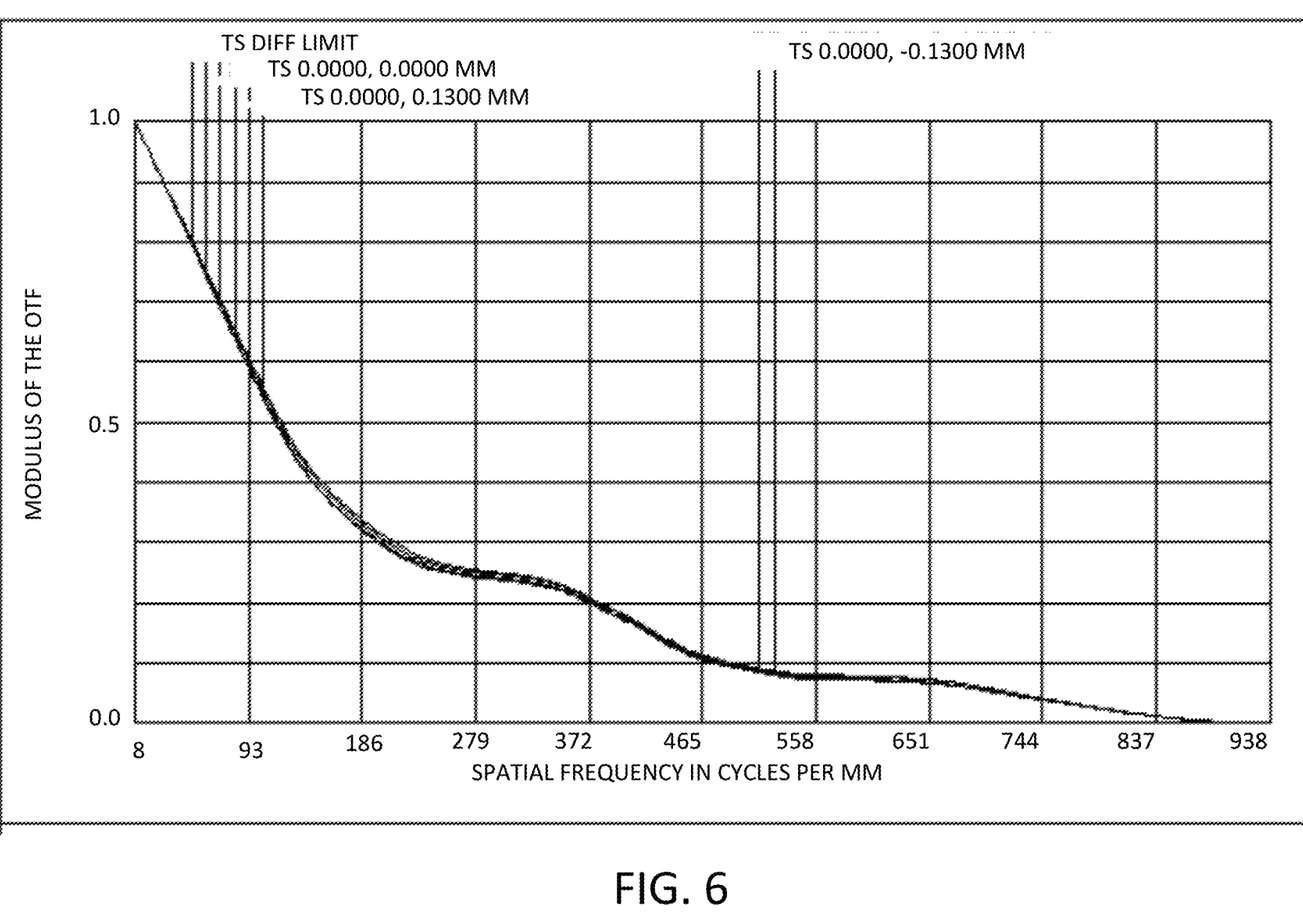
FIG. 6 is a chart showing MTF of the reflective objective lens structure of FIG. 5.

The secondary mirror 102 is after the focus point of the primary concave mirror 101. FIG. 6 shows the MTF of the embodiment of FIG. 5 with a 0.26 mm image field. The image field is extended to 0.26 mm and has near to diffraction limit (or acceptable) MTF.

Figure 7:
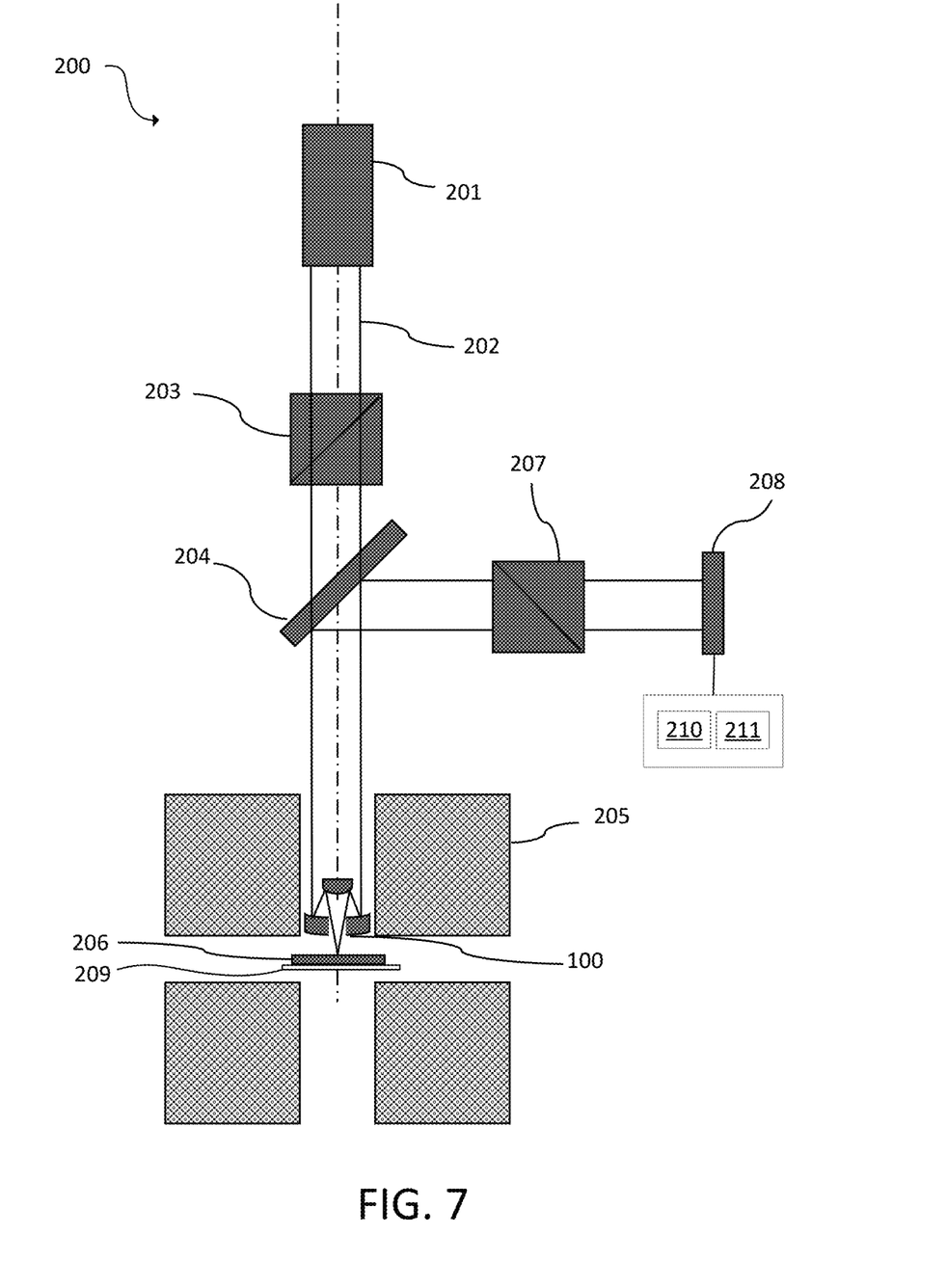
FIG. 7 is a diagram of a polar MOKE metrology system with a reflective objective lens structure in accordance with the present disclosure.

FIG. 7 illustrates a system 200 with the Cassegrain reflective objective lens 100. The system 200 can be a wafer metrology tool. A laser source 201 generates the laser beam 202. The laser beam 202 passes through the polarizer 203 and beam splitter 204 before reaching the quasi-Cassegrain reflective objective lens 100. The polarizer 203 can be configured to change the laser beam 202 into a high polarization extinction ratio laser beam. For example, the laser beam 202 can use Glan-Laser Calcite Polarizers with 100000:1 extinction ratio. The laser beam 202 is focused to the sample 206 with the quasi-Cassegrain reflective objective lens 100. The sample 206, which may be a semiconductor wafer, is held on a stage 209. The quasi-Cassegrain reflective objective lens 100 can be disposed in or around an electromagnet 205. The quasi-Cassegrain reflective objective lens 100 can be positioned at a center of the electromagnet 205 such that the sample 206 is in a focus plane of the quasi-Cassegrain reflective objective lens 100. The electromagnet 205 can have a field strength from 0 T to 1.8 T, though other values are possible.

The laser beam 202 reflected from the sample 206 passes through the Cassegrain reflective objective lens 100 and the beam splitter 204. The laser beam 202 is directed to an analyzer 207 and detector 208. Thus, the detector 208 receives the laser beam 202 reflected from the sample 206. A magnetization state change in the sample 206 can induce a reflected beam polarization state change accordingly with electromagnet-induced magnetic field strength or direction change. The changed polarization state is detected in amplitude at the detector 208 after laser beam 202 passes the analyzer 207. For example, a silicon PIN photodiode can be used as the detector 208.

As shown in FIG. 7, the beam splitter 204 is disposed in the path of the laser beam 202 between the polarizer 203 and the quasi-Cassegrain reflective objective lens 100. The detector 208 receives the laser beam 202 from the beam splitter 204. In an instance, the analyzer 207 receives the laser beam 202 directly from the beam splitter 204.

While the system 200 is disclosed as producing a laser beam 202 with the laser source 201, the system 202 may produce a beam of light with other sources or may use other techniques to measure a surface of the sample 206. In one example, the system 200 includes a laser, lamp, globar, or laser-drive light source (LDLS). In another example, the system 200 is a broad-band plasma inspection tool and the system 200 includes a broad-band plasma source. The system 200 can provide information about the sample 206 or can provide information used to form images of the sample 206.

In particular, the system 200 can be configured to provide one or more of rotating polarizer data, rotating compensator spectroscopic ellipsometry data; full Mueller matrix components data; rotating polarizer spectroscopic ellipsometry data; reflectometry data; laser-driven spectroscopic reflectometry data; or X-ray data.

In an instance, the system 200 provides spectroscopic ellipsometry using a broadband light source, the detector 208 measures how the light source interacts with the target, and processing algorithms that extract the relevant parameters of the target. In another instance, the laser source 201 may be a LDLS, which can provide high intensities and increase the signal-to-noise ratio at the detector, as opposed to a Xe lamp. In an example, the collection system includes a series of polarizers (rotating or fixed), compensators (rotating or fixed), detectors, spectrometers, cameras, lenses, mirrors, and/or collimators. To enhance target signatures, the system may use $N_2$ or Ar gas purge to extend the wavelength range to 170 nm or below.

The system 200 communicates with a processor 210 and an electronic data storage unit 211 in electronic communication with the processor 210. For example, the processor 210 can communicate with the detector 208 or other components of the system 200. The processor 210 may be implemented in practice by any combination of hardware, software, and firmware. Also, its functions as described herein may be performed by one unit, or divided up among different components, each of which may be implemented in turn by any combination of hardware, software, and firmware. Program code or instructions for the processor 210 to implement various methods and functions may be stored in controller readable storage media, such as a memory in the electronic data storage unit 211, within the processor 210, external to the processor 210, or combinations thereof.

The processor 210 may be coupled to the components of the system 200 in any suitable manner (e.g., via one or more transmission media, which may include wired and/or wireless transmission media) such that the processor 210 can receive the output generated by the system 200, such as output from the detector 208. The processor 210 may be configured to perform a number of functions using the output. For instance, the processor 210 may be configured to measure layers on the sample 206. In another example, the processor 210 may be configured to send the output to an electronic data storage unit 211 or another storage medium without reviewing the output. The processor 210 may be further configured as described herein.

The processor 210, other system(s), or other subsystem(s) described herein may take various forms, including a personal computer system, image computer, mainframe computer system, workstation, network appliance, internet appliance, or other device. The subsystem(s) or system(s) may also include any suitable processor known in the art, such as a parallel processor. In addition, the subsystem(s) or system(s) may include a platform with high speed processing and software, either as a standalone or a networked tool. For example, the processor 210 may include a microprocessor, a microcontroller, or other devices.

The processor 210 may be in electronic communication with the detector 208 or other components of the system 200. The processor 210 may be configured according to any of the embodiments described herein. The processor 210 also may be configured to perform other functions or additional steps using the output of the detector 208 or using images, measurements, or data from other sources.

In an instance, the system 200 in FIG. 7 may include an illumination system which illuminates a target (e.g., the laser source 201); a detector 208 which captures relevant information provided by the illumination system's interaction (or lack thereof) with a target, device, or feature on the sample 206; and a processor 210 which analyzes the information collected using one or more algorithms.

While illustrated as on the same axis in FIG. 7, the laser beam 202 from the laser source 201 may be directed at the sample 206 at an angle and can be reflected from the sample 206 to the detector 208 at a different angle.

The system 200 can include one or more hardware configurations which may be used to measure the various semiconductor structural and material characteristics. Examples of such hardware configurations include, but are not limited to, a spectroscopic ellipsometer (SE); an SE with multiple angles of illumination; an SE measuring Mueller matrix elements (e.g., using rotating compensator(s)); a single-wavelength ellipsometers; a beam profile ellipsometer (angle-resolved ellipsometer); a beam profile reflectometer (angle-resolved reflectometer); a broadband reflective spectrometer (spectroscopic reflectometer); a single-wavelength reflectometer; an angle-resolved reflectometer; an imaging system; or a scatterometer (e.g., speckle analyzer). The hardware configurations can be separated into discrete operational systems or can be combined into a single tool.

The illumination system of certain hardware configurations can include one or more light sources. The light source may generate light having only one wavelength (i.e., monochromatic light), light having a number of discrete wavelengths (i.e., polychromatic light), light having multiple wavelengths (i.e., broadband light), and/or light the sweeps through wavelengths, either continuously or hopping between wavelengths (i.e., tunable sources or swept source). Examples of suitable light sources are: a white light source, an ultraviolet (UV) laser, an arc lamp or an electrode-less lamp, a laser-sustained plasma (LSP) source, a supercontinuum source such as a broadband laser source, shorter-wavelength sources such as X-ray sources, extreme UV sources, or some combination thereof. The light source may also be configured to provide light having sufficient brightness, which in some cases may be a brightness greater than about 1 W/(nm $cm^2$ Sr). The wafer system 200 may also include a fast feedback to the light source for stabilizing its power and wavelength. Output of the light source can be delivered via free-space propagation, or in some cases delivered via optical fiber or light guide of any type.

The system 200 may be designed to make many different types of measurements related to semiconductor manufacturing. For example, in certain embodiments the system 200 may measure characteristics of one or more targets, such as critical dimension, overlay, sidewall angles, film thicknesses, or process-related parameters (e.g., focus and/or dose). The targets can include certain regions of interest that are periodic in nature, such as gratings in a memory die. Targets can include multiple layers (or films) whose thicknesses can be measured by the system 200. Targets can include target designs placed (or already existing) on the semiconductor wafer for use, such as with alignment and/or overlay registration operations. Certain targets can be located at various places on the semiconductor wafer. For example, targets can be located within the scribe lines (e.g., between dies) and/or located in the die itself. In certain embodiments, multiple targets are measured (at the same time or at differing times) by the same or multiple metrology tools. The data from such measurements may be combined. Data from the metrology tool can be used in the semiconductor manufacturing process, for example, to feed-forward, feed-backward, and/or feed-sideways corrections to the process (e.g., lithography, etch) and, therefore, can yield a complete process control solution.

To improve measurement accuracy and matching to actual device characteristics and to improve in-die or on-device measurements, various metrology implementations can be used. For example, focused beam ellipsometry based on primarily reflective optics can be used. Apodizers can be used to mitigate the effects of optical diffraction causing the spread of the illumination spot beyond the size defined by geometric optics. The use of high-NA tools with simultaneous multiple area of interest illumination is another way to achieve small-target capability. Other measurement examples may include measuring the composition of one or more layers of the semiconductor stack, measuring certain defects on (or within) the wafer, and measuring the amount of photolithographic radiation exposed to the wafer. In some cases, a metrology tool and algorithm may be configured for measuring non-periodic targets.

In addition, there are typically numerous optical elements in such systems, including certain lenses, collimators, mirrors, quarter-wave plates, polarizers, detectors, cameras, apertures, and/or light sources. The wavelengths for optical systems can vary from about 120 nm to 3 microns. For non-ellipsometer systems, signals collected can be polarization-resolved or unpolarized. Multiple metrology heads can be integrated on the same tool. However, in many cases, multiple metrology tools are used for measurements on a single or multiple metrology targets.

Measurement of parameters of interest usually involves a number of algorithms. For example, optical interaction of the incident beam with the sample can be modeled using an electro-magnetic (EM) solver and can use algorithms such as rigorous coupled-wave analysis (RCWA), finite element method (FEM), method of moments, surface integral method, volume integral method, finite-difference time-domain (FDTD), and others. The target of interest is usually modeled (parametrized) using a geometric engine, or in some cases, process modeling engine or a combination of both. A geometric engine can be implemented, such as the AcuShape software product of KLA Corporation.

Collected data can be analyzed by a number of data fitting and optimization techniques and technologies including: libraries; fast-reduced-order models; regression; machine-learning algorithms such as neural networks and support-vector machines (SVM); dimensionality-reduction algorithms such as principal component analysis (PCA), independent component analysis (ICA), and local-linear embedding (LLE); sparse representation such as Fourier or wavelet transform; Kalman filter; algorithms to promote matching from same or different tool types; and others. Collected data can also be analyzed by algorithms that do not include modeling, optimization and/or fitting.

Computational algorithms are usually optimized for metrology applications with one or more approaches being used such as design and implementation of computational hardware, parallelization, distribution of computation, load-balancing, multi-service support, or dynamic load optimization. Different implementations of algorithms can be done in firmware, software, field programmable gate array (FPGA), and programmable optics components, etc.

The data analysis and fitting steps usually pursue one or more goals. For example, the goal may be measurement of critical dimension, sidewall angle (SWA), shape, stress, composition, films, bandgap, electrical properties, focus/dose, overlay, generating process parameters (e.g., resist state, partial pressure, temperature, and focusing model), and/or any combination thereof. The goal may be modeling and/or design of metrology systems. The goal also may be modeling, design, and/or optimization of metrology targets.

Embodiments of the present disclosure address the field of semiconductor metrology and are not limited to the hardware, algorithm/software implementations and architectures, and use cases summarized above.

Figure 8:
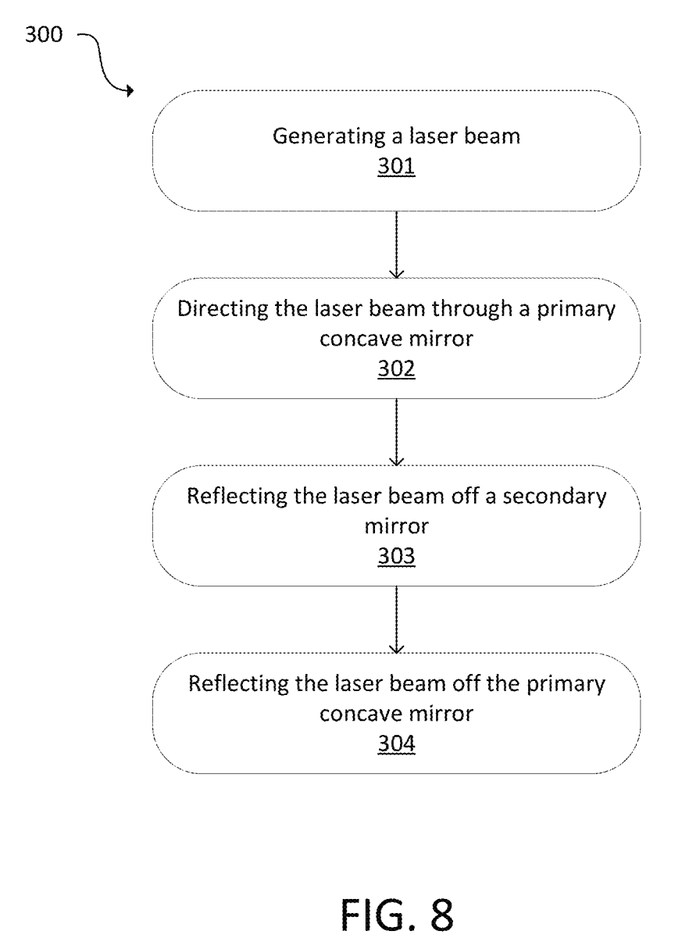
FIG. 8 is a flowchart of a method in accordance with the present disclosure.

FIG. 8 is a flowchart of a method 300. The method can use the quasi-Cassegrain reflective objective lens 100 or other systems. At 301, a laser beam is generated using a laser source. The laser beam is directed through an aperture in a primary concave mirror of a quasi-Cassegrain reflective objective lens at 302. The laser beam is reflected off a secondary mirror of the quasi-Cassegrain reflective objective lens after the laser beam passes through the aperture at 303. The primary concave mirror has a wider diameter than the secondary mirror, which can be convex, concave, or have a flat surface. The laser beam is then reflected off the primary concave mirror after the laser beam is reflected off the secondary mirror at 304. The primary concave mirror can converge the laser beam.

The laser beam can be directed to a wafer on a stage after the laser beam is reflected off the primary concave mirror and then received at a detector after the laser beam is reflected off the wafer. In an embodiment, the wafer has one or more STT-MRAM devices or other memory devices.

In an instance, the laser beam is directed through a polarizer disposed in a path of the laser beam between the laser source and the quasi-Cassegrain reflective objective lens.

In an instance, the laser beam is directed through a beam splitter disposed in a path of the laser beam between the quasi-Cassegrain reflective objective lens and the detector.

Although the present disclosure has been described with respect to one or more particular embodiments, it will be understood that other embodiments of the present disclosure may be made without departing from the scope of the present disclosure. Hence, the present disclosure is deemed limited only by the appended claims and the reasonable interpretation thereof.

What is claimed is:

1. A system comprising:
    a laser source that generates a laser beam;
    an electromagnet;
    reflective objective lens that includes a primary concave mirror and a secondary mirror, wherein the primary concave mirror has a wider diameter than the secondary mirror and is configured to converge the laser beam, wherein the primary concave mirror defines an aperture through which the laser beam is configured to be transmitted toward the secondary mirror, wherein the secondary mirror has a surface opposite the primary concave mirror that receives the laser beam and that is concave or has a flat surface, and wherein the reflective objective lens is disposed in the electromagnet such that the electromagnet and the reflective objective lens are disposed in a same plane perpendicular to an optical axis of the laser beam;
    a stage configured to hold a wafer, wherein the wafer is in a focus plane of the reflective objective lens; and
    a detector configured to receive the laser beam reflected from the wafer.

2. The system of claim 1, wherein the primary concave mirror is aspheric.

3. The system of claim 1, wherein the surface opposite the primary concave mirror has the flat surface.

4. The system of claim 3, wherein the primary concave mirror has a non-parabolic aspherical surface.

5. The system of claim 1, wherein the surface opposite the primary concave mirror is concave.

6. The system of claim 5, wherein the primary concave mirror has a non-parabolic aspherical surface.

7. The system of claim 1, further comprising a polarizer and a beam splitter in a path of the laser beam, wherein the beam splitter is disposed in the path of the laser beam between the polarizer and the reflective objective lens, and wherein the detector receives the laser beam from the beam splitter.

8. The system of claim 1, wherein the laser beam is transmitted directly from the reflective objective lens to a surface of the wafer on the stage.

9. A method comprising:
generating a laser beam using a laser source;
generating a field using an electromagnet;
directing the laser beam through an aperture in a primary concave mirror of a reflective objective lens, wherein the electromagnet and the reflective objective lens are disposed in a same plane perpendicular to an optical axis of the laser beam;
reflecting the laser beam off a secondary mirror of the reflective objective lens after the laser beam passes through the aperture, wherein the primary concave mirror has a wider diameter than the secondary mirror, and wherein the secondary mirror has a surface opposite the primary concave mirror that receives the laser beam and that is concave or has a flat surface;
reflecting the laser beam off the primary concave mirror after the laser beam is reflected off the secondary mirror, wherein the primary concave mirror and the secondary mirror are disposed in the electromagnet; and
directing the laser beam to a wafer on a stage after the laser beam is reflected off the primary concave mirror, wherein the wafer is in a focus plane of the reflective objective lens.

10. The method of claim 9, further comprising:
receiving the laser beam at a detector after the laser beam is reflected off the wafer.

11. The method of claim 10, further comprising directing the laser beam through a polarizer disposed in a path of the laser beam between the laser source and the reflective objective lens.

12. The method of claim 10, further comprising further comprising directing the laser beam through a beam splitter disposed in a path of the laser beam between the reflective objective lens and the detector.

13. The method of claim 10, wherein the wafer includes at least one spin-transfer torque magnetic random access memory device.

14. The method of claim 9, further comprising converging the laser beam with the primary concave mirror.

15. The method of claim 9, wherein the surface opposite the primary concave mirror has the flat surface.

16. The method of claim 9, wherein the surface opposite the primary concave mirror is concave.

17. The method of claim 9, wherein the field has a field strength from greater than 0 T to 1.8 T.

18. The method of claim 9, further comprising determining spectroscopic ellipsometer information using the laser beam.

19. The method of claim 9, wherein the laser beam is transmitted directly to a surface of the wafer after reflecting the laser beam off the primary concave mirror.

* * * * *